United States Patent
Bhosale et al.

(10) Patent No.: US 9,550,348 B2
(45) Date of Patent: Jan. 24, 2017

(54) FRICTIONAL WELD JOINT FOR AN ARTICLE COMPRISING A THERMOPLASTIC MATERIAL

(75) Inventors: Ankur M. Bhosale, Canton, MI (US); Prasanna Kondapalli, Ypsilanti, MI (US); William J. McMaster, Berkeley Heights, NJ (US)

(73) Assignee: BASF SE, Ludwigshafen (DE)

( * ) Notice: Subject to any disclaimer, the term of this patent is extended or adjusted under 35 U.S.C. 154(b) by 250 days.

(21) Appl. No.: 14/119,398

(22) PCT Filed: May 23, 2012

(86) PCT No.: PCT/US2012/039088
§ 371 (c)(1),
(2), (4) Date: Nov. 21, 2013

(87) PCT Pub. No.: WO2012/162362
PCT Pub. Date: Nov. 29, 2012

(65) Prior Publication Data
US 2014/0126954 A1    May 8, 2014

Related U.S. Application Data

(60) Provisional application No. 61/488,920, filed on May 23, 2011.

(51) Int. Cl.
*B29C 65/06* (2006.01)
*B32B 37/30* (2006.01)
(Continued)

(52) U.S. Cl.
CPC ............... *B32B 37/30* (2013.01); *B29C 65/06* (2013.01); *B29C 65/08* (2013.01);
(Continued)

(58) Field of Classification Search
CPC .. Y10T 403/477; B29C 65/06; B29C 65/0618; B29C 65/08; B32B 37/30
See application file for complete search history.

(56) References Cited

U.S. PATENT DOCUMENTS 4,601,927 A    7/1986  Durfee
4,631,685 A    12/1986 Peter
(Continued)

FOREIGN PATENT DOCUMENTS

CN      1593834 A      3/2005
CN    101124396 A      2/2008
(Continued)

OTHER PUBLICATIONS

International Search Report for Application No. PCT/US2012/039088 dated Aug. 3, 2012, 3 pages.
(Continued)

*Primary Examiner* — Jonathan Masinick
(74) *Attorney, Agent, or Firm* — Howard & Howard Attorneys PLLC

(57) ABSTRACT

A frictional weld joint couples first and second body portions of an article together. The frictional weld joint comprises a first bead extending from the first body portion of the article and a second bead extending from the second body portion of the article. The second bead has an interior stem and an exterior stem space from the interior stem defining a cavity therebetween. The first and second beads are placed in contact with each other with the centerline of the second bead offset from the centerline of the first bead. A force is applied to either the first or second body portions to generate friction between the first and second beads to plastically displace the first and second beads. The force is
(Continued)

removed for fusing the first and second beads together to couple together the first and the second body portions of the article.

22 Claims, 4 Drawing Sheets

(51) Int. Cl.
    *B29C 65/08*     (2006.01)
    *B29C 65/00*     (2006.01)
    *F02M 35/10*     (2006.01)
    *B29C 65/82*     (2006.01)
    *B29L 31/00*     (2006.01)

(52) U.S. Cl.
CPC ........ *B29C 65/8246* (2013.01); *B29C 66/124* (2013.01); *B29C 66/1312* (2013.01); *B29C 66/3022* (2013.01); *B29C 66/30221* (2013.01); *B29C 66/322* (2013.01); *B29C 66/343* (2013.01); *B29C 66/54* (2013.01); *B29C 66/73921* (2013.01); *B29C 66/8322* (2013.01); *F02M 35/1036* (2013.01); *F02M 35/10321* (2013.01); *B29C 66/71* (2013.01); *B29C 66/712* (2013.01); *B29C 66/959* (2013.01); *B29L 2031/7492* (2013.01); *Y10T 403/477* (2015.01)

(56) References Cited

U.S. PATENT DOCUMENTS

| | | | |
|---|---|---|---|
| 4,919,987 | A | 4/1990 | Manner |
| 5,199,593 | A | 4/1993 | Kita |
| 5,263,606 | A | 11/1993 | Dutt et al. |
| 5,401,342 | A | 3/1995 | Vincent et al. |
| 5,540,808 | A | 7/1996 | Vincent et al. |
| 5,670,108 | A | 9/1997 | Kern et al. |
| 5,914,159 | A | 6/1999 | Kato |
| 6,001,201 | A | 12/1999 | Vincent et al. |
| 6,131,573 | A | 10/2000 | Brown |
| 6,179,157 | B1 | 1/2001 | Merz |
| 6,209,541 | B1 | 4/2001 | Wallace |
| 6,447,866 | B1 | 9/2002 | Kagan et al. |
| 6,588,970 | B1 | 7/2003 | Natrop |
| 6,663,933 | B2 | 12/2003 | Nakajima et al. |
| 6,706,357 | B2 | 3/2004 | Sugimura et al. |
| 6,726,790 | B2 | 4/2004 | Kagan et al. |
| 6,913,186 | B2 | 7/2005 | Vyas |
| 6,988,478 | B2 | 1/2006 | Tanikawa et al. |
| 7,174,873 | B2 | 2/2007 | Uematsu |
| 7,331,652 | B2 | 2/2008 | Hattori et al. |
| 7,451,732 | B1 | 11/2008 | Vichinsky et al. |
| 7,516,871 | B2 | 4/2009 | Gerbron |
| 8,186,324 | B2 | 5/2012 | Iwata |
| 2003/0155062 | A1 | 8/2003 | Kagan et al. |
| 2003/0205565 | A1 | 11/2003 | Nelson et al. |
| 2004/0145177 | A1 | 7/2004 | Miyahara et al. |

FOREIGN PATENT DOCUMENTS

| | | |
|---|---|---|
| EP | 1 602 468 A2 | 12/2005 |
| JP | H 06-285994 A | 10/1994 |
| JP | H 07-186263 A | 7/1995 |
| JP | H 11-227051 A | 8/1999 |
| JP | 2003-260737 A | 9/2003 |
| JP | 2005-319613 A | 11/2005 |
| JP | 2005-337108 A | 12/2005 |
| JP | 2009-066819 A | 4/2009 |
| JP | 2013-099778 A | 5/2013 |
| WO | WO0128757 A1 | 4/2001 |
| WO | WO 02/14052 A1 | 2/2002 |
| WO | WO2013177399 A1 | 11/2013 |

OTHER PUBLICATIONS

Chevron Phillips Chemical Company LP, "Ultrasonic Welding Ryton PPS Compounds", Ryton Polyphenylene Sulfide Resins, Technical Service Memorandum, TSM-324, Jan. 2002, www.cpchem.com/bl/rytonpps/en-us/documents/tsm324.pdf, printed 2011, 3 pages.
Eastman Chemical Company, "Ultrasonic Welding of Eastman Polymers", Publication TRS-216A, Jul. 2004.
Kenney, Warren E., Joint Design a Critical Factor in Strong Bonds, originally published Spring 1995 in Engineering Design Magazine, 3 pages.
Sonics & Materials, Inc., Joint Designs for Ultrasonic Welding, 2001, www.sonics.com/plastic-tech-bulletines/joint_designs_for_ultrasonic_welding.pdf, printed 2011, 4 pages.
Sonitek, Joint Design for Ultrasonic Welding, Feb. 2000, www.sonitek.com/ultrasonics/literature/joint%20design.pdf, printed 2011, 4 pages.
English language abstract and machine-assisted English translation for JPH 07-186263 extracted from espacenet.com database on Jul. 6, 2015, 20 pages.
English language abstract and machine-assisted English translation for JP 2003-260737 extracted from espacenet.com database on Jul. 6, 2015, 11 pages.
English language abstract and machine-assisted English translation for JP 2005-319613 extracted from espacenet.com database on Jul. 6, 2015, 25 pages.
Kagan, Val. A. et al., "The Effects of Weld Geometry and Glass-Fiber-Orientation on the Mechanical Performance of Joints—Part II: Kinetics of Glass-Fiber-Orientation and Mechanical Performance", Journal of Reinforced Plastics and Composites, vol. 23, No. 16, 2004, XP007901644, pp. 1687-1694.
English language abstract for CN 1593834 extracted from espacenet.com database on Nov. 2, 2015, 1 page.
International Search Report for PCT/US2013/042430 dated Oct. 18, 2013, 2 pages.
English language abstract and machine-assisted English translation for JPH 11-227051 extracted from espacenet.com database on Feb. 8, 2016, 13 pages.
English language abstract and machine-assisted English translation for WO 02/14052 extracted from espacenet.com database on Feb. 8, 2016, 16 pages.
Dupont, "General Design Principles for DuPont Engineering Polymers (Design Guide—Module I)", 2000, XP007904729, downloaded from http://plastics.dupont.com/plastics/pdflit/americas/general/H76838.pdf on May 16, 2008, pp. 1-136.
Forward Technology (A Crest Group Company), "Hot Plate Welders—Hot Plate General Brochure 205.77 KB", 2006, XP000962871, downloaded from http://www.forwardtech.com/plasticassembly/hotplate/ on Mar. 8, 2006, pp. 1-14.
Kagan, Val A. et al., "Recent Advances and Challenges in Induction Welding of Reinforced Nylon in Automotive Applications", SAE Technical Paper Series, Society of Automotive Engineers, vol. SAE-SP-1850, Mar. 88, 2004, XP007918471, ISSN: 0148-7191, 8 pages.
English language abstract and machine-assisted English translation for JPH 06-285994 extracted from espacenet.com database on Aug. 18, 2016, 8 pages.
English language abstract for JP 2005-337108 extracted from espacenet.com database on Aug. 18, 2016, 2 pages.
English language abstract and machine-assisted English translation for JP 2009-066819 extracted from espacenet.com database on Aug. 18, 2016, 25 pages.
English language abstract and machine-assisted English translation for JP 2013-099778 extracted from espacenet.com database on Aug. 18, 2016, 31 pages.
English language abstract not found for CN 101124396; however, see English language equivalent U.S. Pat. No. 7,174,873. Original document extracted from espacenet.com database on Oct. 11, 2016, 22 pages.

FIG. 1
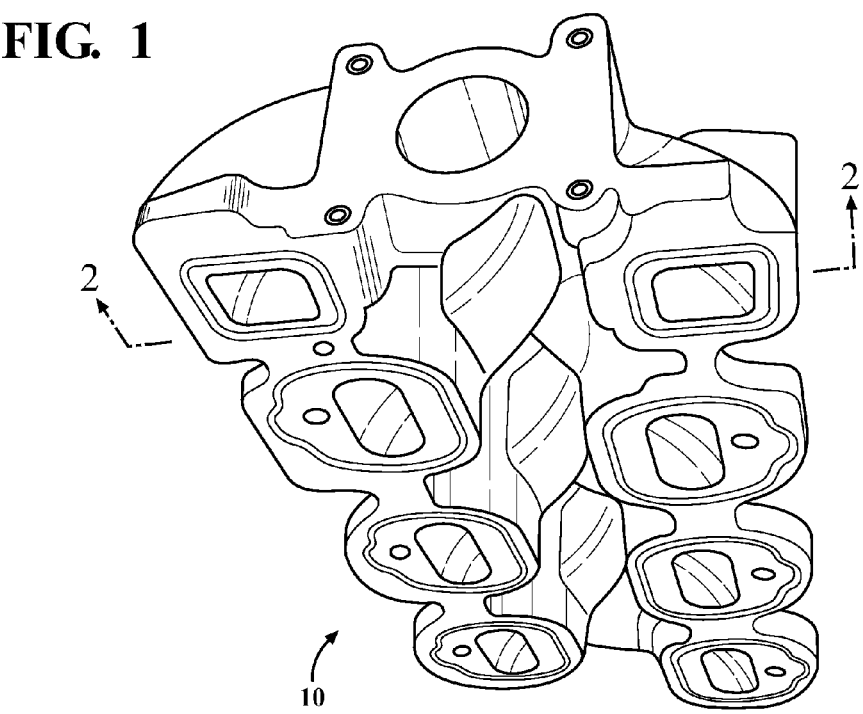
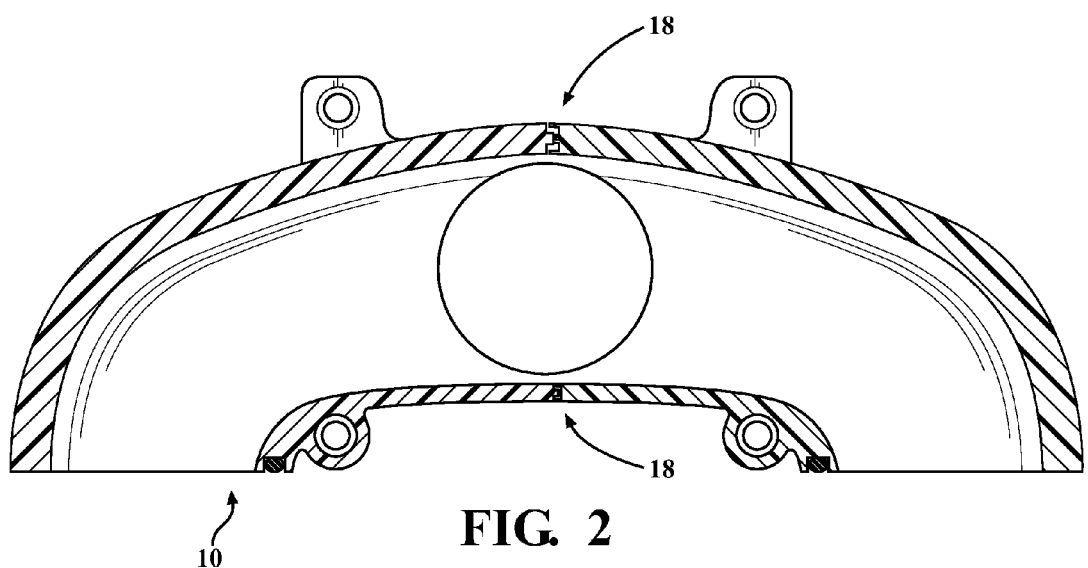
FIG. 2

FRICTIONAL WELD JOINT FOR AN ARTICLE COMPRISING A THERMOPLASTIC MATERIAL

REFERENCE TO CROSS-RELATED APPLICATIONS

This application is the National Stage of International Patent Application No. PCT/US2012/039088, filed on May 23, 2012, which claims priority to and all advantages of U.S. Provisional Patent Application No. 61/488,920 filed on May 23, 2011.

BACKGROUND OF THE INVENTION

1. Field of the Invention

The invention generally relates to an article. More specifically, the invention relates to a frictional weld joint for an article, which comprises a thermoplastic material.

2. Description of the Related Art

The use of frictional weld joints for coupling together first and second body portions of an article is known in the art. A typically frictional weld joint comprises a first bead extending from the first body portion and a second bead extending from the second body portion. Each of the first and second beads of the typically frictional weld joint has a contact surface. The contact surfaces of the first and second beads are placed into contact with each other and a force is applied to the first body portion to generate friction at the contact surface of the first and second beads. The first and second beads are made from a thermoplastic material and the friction results in an increased temperature of the thermoplastic material. As a result of the increased temperature of the thermoplastic material, the first and second beads nest with one another. Subsequently, the force is removed from the first body portion for allowing the thermoplastic material to cool, which results in the first and second beads fusing together.

However, as the force is being applied, small amounts of the thermoplastic material break off from the first and second beads as flash. Small amounts of flash may be beneficial as a way of clearing the contact surfaces of dirt and sediment that might interfere with the fusing of the first and second beads. However, large amounts of flash result in waste and therefore increase manufacturing cost. Additionally, large amounts of flash can also interfere with the frictional weld joint thereby decreasing a strength of the frictional weld joint. Additionally, the flash generated may become loose during the intended life of the article resulting in failure of the frictional weld joint and possibly other components. For example, in the case of air intake manifolds, the flash may become loose and can mix with an air-fuel mixture and eventually get into the engine system, which is undesirable. Furthermore, the generation of flash is an indication of heat losses during the nesting of the first and second beads, which can potentially have a negative impact on a desired total penetration to be achieved by the first and second beads and therefore should be minimized as a good manufacturing practice. Therefore, there remains a need to provide an improved frictional weld joint.

SUMMARY OF THE INVENTION AND ADVANTAGES

A frictional weld joint couples together a first body portion and a second body portion of an article, which comprises a thermoplastic material. The first body portion has a first joint surface and the second body portion has a second joint surface, which is parallel with the first joint surface. The frictional weld joint comprises a first bead coupled to the first body portion and extending axially along a centerline from the first joint surface. The frictional weld joint also comprises a second bead coupled to the second body portion and extending axially along a centerline from the second joint surface. A force is applied to either the first or second body portions of the article to generate friction between the first and second beads. The friction plastically displaces the first and second beads. The force is removed for fusing the first and second beads together to couple together the first body portion and the second body portion of the article.

The second bead has an interior stem and an exterior stem space from the interior stem defining a cavity therebetween for receiving an amount of flash, which results from the fusing of the first and second beads. The first and second beads are placed in contact with each other with the centerline of the second bead offset from the centerline of the first bead. Offsetting the centerlines reduces stresses acting on the frictional weld joint as a result of stresses that act on the first and second body portions. A strength of the frictional weld joint is increased with the reduction of stresses transferred to the frictional weld joint. Therefore, the article can experience greater pressures without the frictional weld joint failing, as compared to prior art weld joints.

BRIEF DESCRIPTION OF THE DRAWINGS

Other advantages of the present invention will be readily appreciated, as the same becomes better understood by reference to the following detailed description, when considered in connection with the accompanying drawings wherein:

FIG. 1 is a perspective view of an article for use as an air intake manifold for an internal combustion engine;

FIG. 2 is a cross-sectional view of the article taken along line 2-2 of FIG. 1;

DETAILED DESCRIPTION OF THE EXEMPLARY EMBODIMENT

Referring to the Figures, wherein like numerals indicate corresponding parts throughout the several views, an article is generally shown at 10. As shown in FIGS. 1 and 2, the article 10 is formed as an air intake manifold for an internal combustion engine. However, it should be understood that the article 10 may be formed into something other than the air intake manifold, such as automotive front and rear tail lamp housings, fuel tanks, or any application wherein two components are joined together using a vibration welding process and still fall within the scope of the disclosure.

Generally, the article 10 comprises a thermoplastic material. It is to be appreciated that the thermoplastic material can be neat, i.e., virgin, uncompounded resin, or that the thermoplastic material can be an engineered product where the resin is compounded with other components, for example with select additives to improve certain physical properties. Additionally, the thermoplastic material may have a regrind content of from about 5-25 percent. Typically, the thermoplastic material is selected from the group of polypropylene, polyvinyl chloride, polystyrene, acrylonitrile butadiene styrene, styrene butadiene, acrylic styrene acrylonitrile, poly methyl methacrylate, polyacetal, polyphenylene oxide, polyethylene terephthalate, polyethylene, polyphenylene sulfide, cellulose acetate, polysulfone, polybutylene terephthalate, polyamide, and combinations thereof. More typically, the thermoplastic material is a polyamide selected from the group of nylon 6, nylon 6/6, polybutylene terephthalate, polyethylene terephthalate, polyacetal, acrylic styrene acrylonitrile, and combinations thereof. However, it should be understood that other thermoplastic materials may also be used to manufacture the article 10. Additionally, the thermoplastic material may be a blend of two or more of the above listed materials. For example, the thermoplastic material may be selected from the group of polyamide blends, a polypropylene and ethylene propylene diene monomer blend, polyphenylene oxide blends, a polycarbonate and acrylonitrile butadiene styrene polymer blend, and a polycarbonate and polybutylene terephthalate blend.

Although not required, the thermoplastic material is typically between 5 and 65 percent filled with fibers, and more preferably, the thermoplastic material is 30 percent filled with fibers. It is to be appreciated that the fibers may be glass fibers. Examples of suitable thermoplastic materials include, but are not limited to Ultramid®️ polyamides, Ultradur®️, Ultraform®️, Ultrason®️, Luran®️, and Terluran®️ grades commercially available from BASF Corp.

Figure 3:
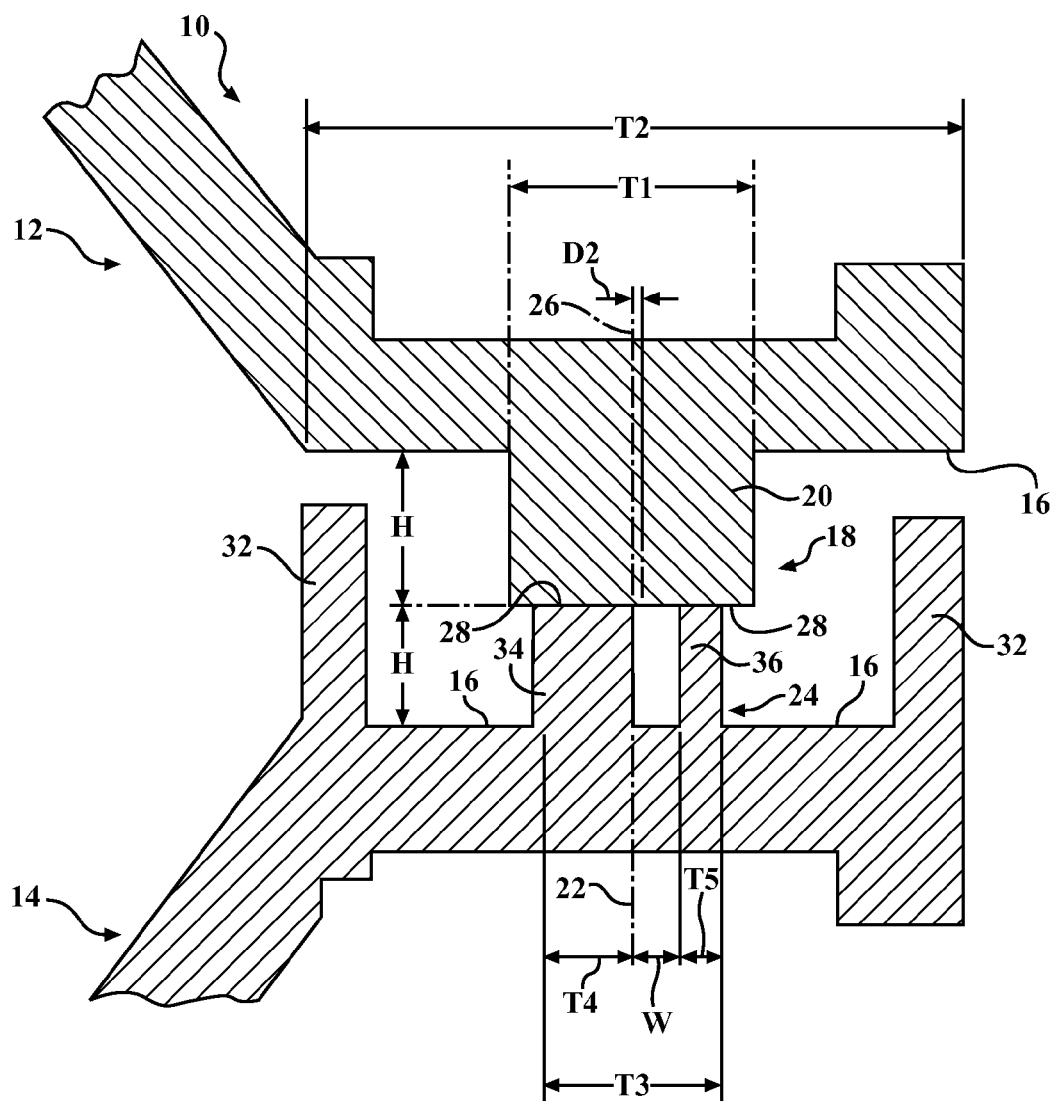
FIG. 3 is a cross-sectional view of a portion of FIG. 2 showing a frictional weld joint.

The article 10 comprises a first body portion 12 and a second body portion 14. The first and second body portions 12, 14 are configured for coupling with one another to form the article 10. Said differently, when the first and second body portions 12, 14 are coupled together, the first and second body portions 12, 14 define the article 10. With reference to FIGS. 3, each of the first and second body portions 12, 14 have a joint surface 16. Said differently, the first body portion 12 has a first joint surface 16A and the second body portion 14 has a second joint surface 16B. The second joint surface 16B is parallel to the first joint surface 16A. A frictional weld joint 18 is disposed between the first and second joint surfaces 16A, 16B. The frictional weld joint 18 couples together the first and second body portions 12, 14 to form the article 10.

A method is used to couple together the first and second body portions 12, 14 via the frictional weld joint 18. The frictional weld joint 18 comprises a first bead 20 coupled to the first joint surface 16A. The first bead 20 extends axially along a centerline 22 from the first joint surface 16A. The frictional weld joint 18 also comprises a second bead 24 coupled to the second joint surface 16B. The second bead 24 extends axially along a centerline 26 from the second joint surface 16B. Each of the first and second beads 20, 24 has a contact surface 28 spaced from a respective one of the first joint surface 16A or the second joint surface 16B. The first and second beads 20, 24 define a cross-sectional area of the contact surface 28.

The first and second beads 20, 24 each have a height H defined between a respective one of the first joint surface 16A or the second joint surface 16B and the contact surface 28 of the first or second beads 20, 24, respectively. The height H of the first and second beads 20, 24 is typically less than about 5.0, more typically of from about 2.0 to about 4.0, and even more typically of from about 2.7 to about 3.5 millimeters. It is to be appreciated that the first and second beads 20, 24 may have different height as compared to each other or, in some instances, one of the first and second beads 20, 24 may be eliminated depending on space restrictions. For example, the first bead 20 may be shorter or longer than the second bead 24.

It is to be appreciated that the first and second beads 20, 24 may have any suitable cross-sectional configuration. For example, each of the first and second beads 20, 24 may have a rectangular cross-section, or a circular cross-section. It is to be appreciated that the first bead 20 may have a different cross-section as compared to the second bead 24. For example, the first bead 20 may have the rectangular cross-section and the second bead 24 may have the circular cross-section.

Typically, the first and second beads 20, 24 comprise the thermoplastic material of the article 10. For example, the first and second beads 20, 24 may comprise unfilled and/or glass filled nylon, nylon 6/6, polyvinyl chloride, polybutylene terephthalate, polyacetal, and combinations thereof. It is to be appreciated that the first and second beads 20, 24 may comprise a different thermoplastic material as compared to the thermoplastic material of the first and second body portions 12, 14.

Prior to coupling the first and second body portions 12, 14 together, the second bead 24 is spaced from the first bead 20. The first and second beads 20, 24 are positioned in contact with each other with the centerline 22 of the second bead 24 offset from the centerline 26 of the first bead 20. More specifically, the contact surface 28 of each of the first and second beads 20, 24 is positioned in contact with each other. A clamp pressure may be applied to the first and second body portions 12, 14 to temporarily hold the first and second body portions 12, 14 together. The clamp pressure is typically of from about 1.0 to about 7.0, more typically of from about 1.2 to about 4.0, even more typically of from about 1.5 to about 2.5 Mpa.

A force is applied to either the first or second body portions 12, 14 of the article 10 to generate friction between the first and second beads 20, 24. The application of the force results in the production of friction between the contact surface 28 of the first and second beads 20, 24. The friction generates heat that results in a heating of the thermoplastic material of the first and second beads 20, 24 from a normal temperature towards a melting temperature of the thermoplastic material. The application of the force may be further defined as frictionally welding the first and second beads 20, 24 together such that one of the first or second body portions 12, 14 reciprocate against the other one of the first and second beads 20, 24 at a low frequency. Typically, the low frequency used in the frictional welding is of from about 100 to about 300, more typically of from about 150 to about 240, and even more typically of from about 180 to about 220 hertz. Additionally, it is to be appreciated that the application of the force may be further defined as ultrasonically welding the first and second beads 20, 24 together such that one of the first or second body portions 12, 14 reciprocate against the other one of the first and second beads 20, 24 at a high frequency. The high frequency used in ultrasonic welding is typically of from about 15,000 to about 72,000, more typically of from about 15,000 to about 60,000, and even more typically of from about 15,000 to about 40,000 hertz.

Figure 4:
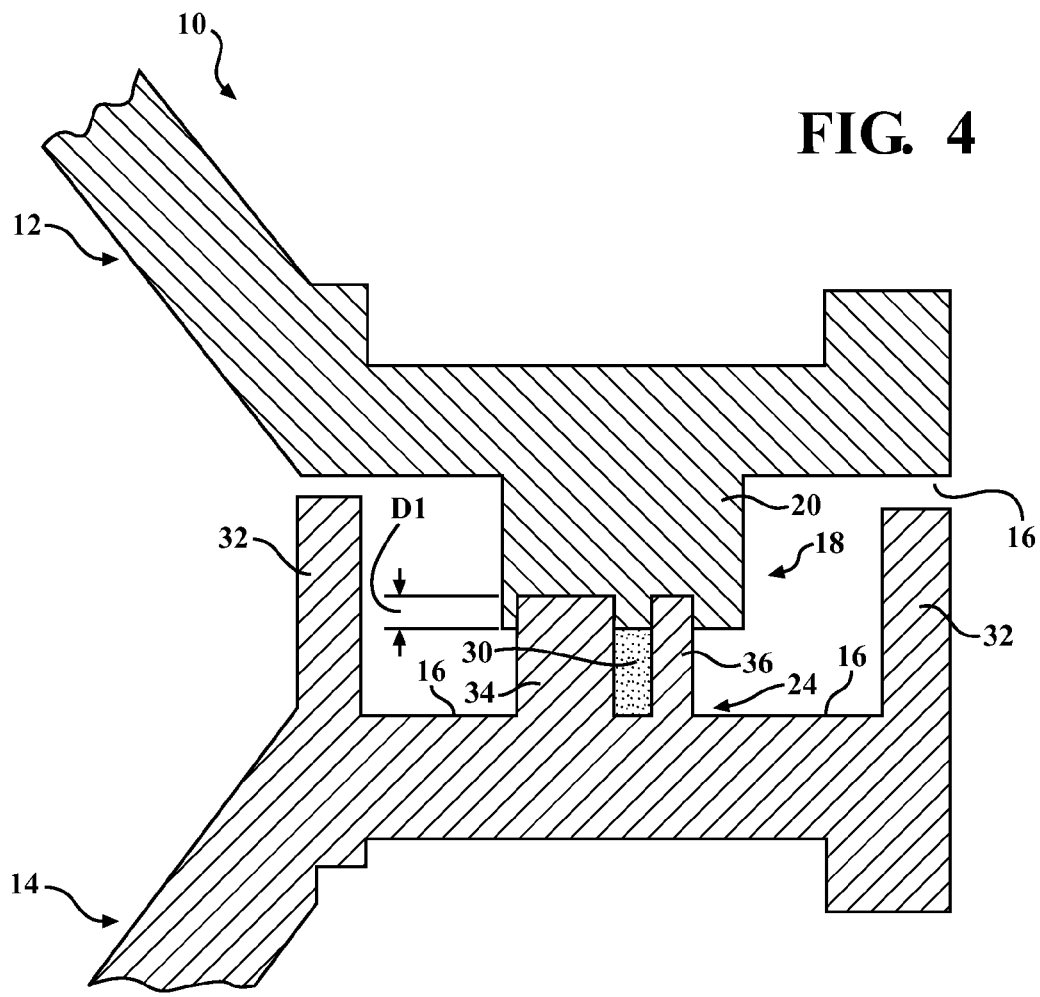
FIG. 4 is cross-section view of a portion of FIG. 2 showing the frictional weld joint with a second bead penetrating a first bead.

The heating of the first and second beads 20, 24 allows either the first or second beads 20, 24 to penetrate the other one of the first and second beads 20, 24, as shown in FIG. 4. Said differently, as the thermoplastic material of the first and second beads 20, 24 approaches the melting temperature of the thermoplastic material, one of the first or second beads 20, 24 penetrates the other. It is to be appreciated that the pressure holding the first and second beads 20, 24 together may also be present during the step of applying the force to help force the first or second beads 20, 24 to penetrate the other one of the first and second beads 20, 24. The heating of the first and second beads 20, 24 also results in the production of flash 30. Therefore, the article 10 may also have a pair of flash dams 32 for containing the spread of the flash 30. The flash dams 32 are coupled to at least one of the first and second body portions 12, 14. Typically, the flash dams 32 are coupled to the second body portion 14, which has the second weld bead 24. Generally, the flash dams 32 are spaced from the first and second beads 20, 24 and are parallel to the first and second beads 20, 24. The flash dams 32 collect the flash 30 within the weld frictional weld joint 18 thereby preventing the flash 30 from becoming loose within the article 10.

In the method, the force is removed for allowing the first and second beads 20, 24 to fuse together to couple together the first body portion 12 and the second body portion 14 of the article 10. Generally, once the force is removed, the heat that was generated by the friction rapidly dissipates and the thermoplastic material of the first and second beads 20, 24 fuse together as the normal temperature of the first and second beads 20, 24 is reached.

Typically, the force is applied to the first body portion 12 to allow the second bead 24 to penetrate the first bead 20. In such an embodiment, the second bead 24 is at least partially disposed within the first bead 20 after the force is removed from the first body portion 12. Typically, the second bead 24 penetrates the first bead 20 by a distance D1 of from about 0.25 to about 2.20 millimeters, more typically of from about 1.00 to about 2.00 millimeters, and even more typically of from about 1.50 to about 1.80 millimeters. However, it is to be appreciated that the second bead 24 may penetrate the first bead 20 such that the second bead 24 is fully encompassed by the first bead 20. Additionally, it is to be appreciated that if the force is applied to the second body portion 14 instead of the first body portion 12, then the first bead 20 will penetrate the second bead 24 in a similar fashion as the second bead 24 described above.

The second bead 24 has an interior stem 34 and an exterior stem 36 spaced from the interior stem 34 defining a cavity 38 therebetween. It is to be appreciated the interior stem 34 is proximate an interior of the article 10 and the exterior stem 36 is distal the interior of the article 10. Because the interior and exterior stems 34, 36 can be spaced from one another to define the cavity 38, the flash 30 that is produce can be captured in the cavity 38. Capturing the flash 30 prevents the flash 30 from entering the article 10. It is also desirable to capture flash from an aesthetics standpoint, which is also a key application requirements when the article 10 is the air-intake manifold. The cavity 38 between the interior and exterior stems 34, 36 has a width typically of from about 1.50 to about 7.00, more typically of from about 3.00 to about 6.00, and even more typically of from about 4.00 to about 5.00 millimeters.

Generally, a thickness T1 of the first bead 20 is uniform between the first joint surface 16A of the article 10 and the contact surface 28 of the first bead 20. Additionally, the thickness of the first bead 20 is less than a thickness T2 of the first joint surface 16A. Typically, the thickness T1 of the first bead 20 is of from about 3.00 to about 8.00, more typically of from about 4.00 to about 7.00, and even more typically of from about 6.00 to about 7.00 millimeters. Typically, a thickness T3 of the second bead 24 is of from about 1.50 to about 7.00, more typically of from about 3.00 to about 6.00, and most typically of from about 4.00 to about 5.00 millimeters. It is to be appreciated that the thickness T3 of the second bead 24 is defined by a thickness T4 of the interior stem 34, a width W of the cavity 38, and a thickness T5 of the exterior stem 36. As such, the thickness T4 of the interior stem 34 of the second bead 24 is typically of from about 2.50 to about 3.5, more typically of from about 2.00 to about 3.00, and even more typically of from about 2.40 to about 2.60 millimeters. The width of the cavity is typically of from about 1.50 to about 7.00, more typically of from about 3.00 to about 6.00, and even more typically of from about 4.00 to about 5.00 millimeters. The thickness T5 of the exterior stem 36 of the second bead 24 is typically of from about 1.10 to about 2.50 and more typically of from about 0.90 to about 1.20 millimeters.

Generally, the article 10 has an interior chamber 38 defined by the first and second body portions 12, 14. The frictional weld joint 18 is disposed about the interior chamber 38. During normal use of the article 10, the chamber may undergo a pressure increase. For example, when the article 10 is the air intake manifold, pressure increases within the air intake manifold. The pressure increase causes a moment force to act on the frictional weld joint 18. The moment force results in a combination of a bending load, a tensile load, and a compressive load acting on the frictional weld joint 18. As such, the frictional weld joint 18 must be able to withstand stresses imparted on the frictional weld joint 18 due to the bending, tensile, and compressive loads without failure.

The centerline 22 of the first bead 20 is offset from the centerline 26 of the second bead 24. Generally, the centerlines 22, 26 of the first and second beads 20, 24 are offset for reducing stresses acting on the frictional weld joint 18 as a result of stresses acting on the first and second body portions 12, 14. An example of stresses acting on the first and second body portions 12, 14 is increased pressure within the interior chamber 38. A strength of the frictional weld joint 18 is increased with the reduction of stresses transferred to the frictional weld joint 18. Therefore, the article 10 can experience greater pressures without the frictional weld joint 18 failing, as compared to other weld joints that are not offset. Typically, the centerline 26 of the second bead 24 is offset from the centerline 22 of the first bead 20 a distance D2 of from about 0.20 to about 0.80, more typically of from about 0.20 to about 0.70, and even more typically of from about 0.20 to about 0.50 millimeters.

It is believed that the combination of splitting the second bead 24 into the interior stem 34 and the exterior stem 36 and offsetting the centerlines 22, 26 of the interior and exterior stems 34, 36 reduces the stresses resulting from the bending, tensile, and compressive loads that act on the frictional weld joint 18 as a result of the moment force. More specifically, offsetting the centerlines 22, 26 of the first and second beads 20, 24 and splitting the second bead 24 limits stresses resulting form the tensile load on the interior stem 34 and the compressive load on the exterior stem 36. Limiting the stresses resulting form the tensile load on the interior stem 34 and the compressive load on the exterior stem 36 allows the thickness of the second bead 24 to be less than the thickness of the first bead 20. Reducing the thickness of the second bead 24 also reduced the cross-sectional area of the contact surface 28 of the second bead 24, which results in less flash 30 being produced during the method of frictional welding because there is less interaction between the contact surface 28 of the first and second beads 20, 24.

In one embodiment, the thickness T1 of the first bead 20 is about 6 millimeters and the thickness T3 of the second bead 24 is about 4.6 millimeters. In such an embodiment, the thickness T4 of the interior stem 34 is about 2.5 millimeters, the thickness T5 of the exterior stem 36 is about 1.1 millimeters and the width W of the cavity 38 is about 1.0 millimeters. Additionally, in such an embodiment, the centerline 22 of the second bead 24 is offset a distance D1 of about 0.2 millimeters from the centerline 22 of the first bead 20.

Although the above description has been described for coupling together the first and second body portions 12, 14 of the article 10, it is to be appreciated that the frictional weld joint 18 can be used to couple together any thermoplastic bodies, including multiple article 10s. It is to be appreciated that although the second bead 24 has been described as being split into the interior and exterior stems 34, 36, the first bead 20 may be split into the interior and an exterior stem 36. Additionally, it is also to be appreciated that both the first and second beads 20, 24 may be split into the interior and exterior beads.

EXAMPLES

Figure 5:
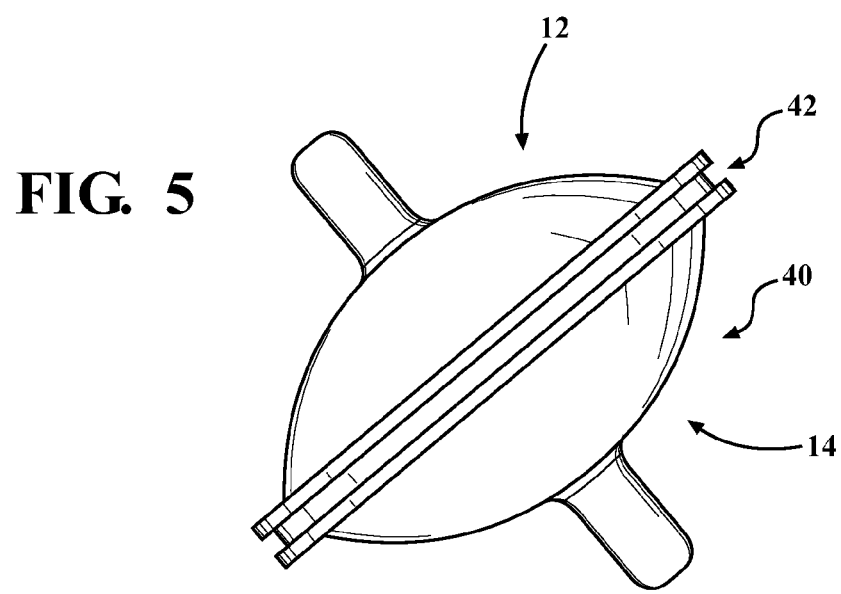
FIG. 5 is a perspective view of the article as a test article having a joint.
Figure 6:
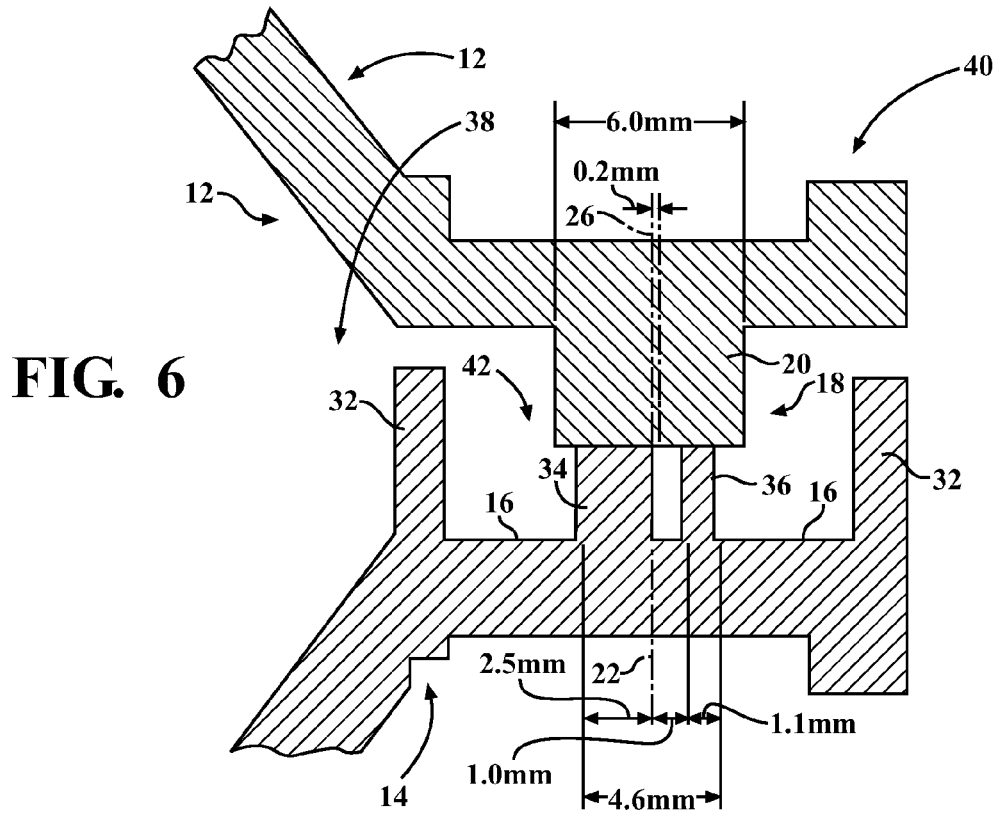
FIG. 6 is a cross-sectional view of the test article of FIG. 5 showing the joint as the frictional weld joint.
Figure 7:
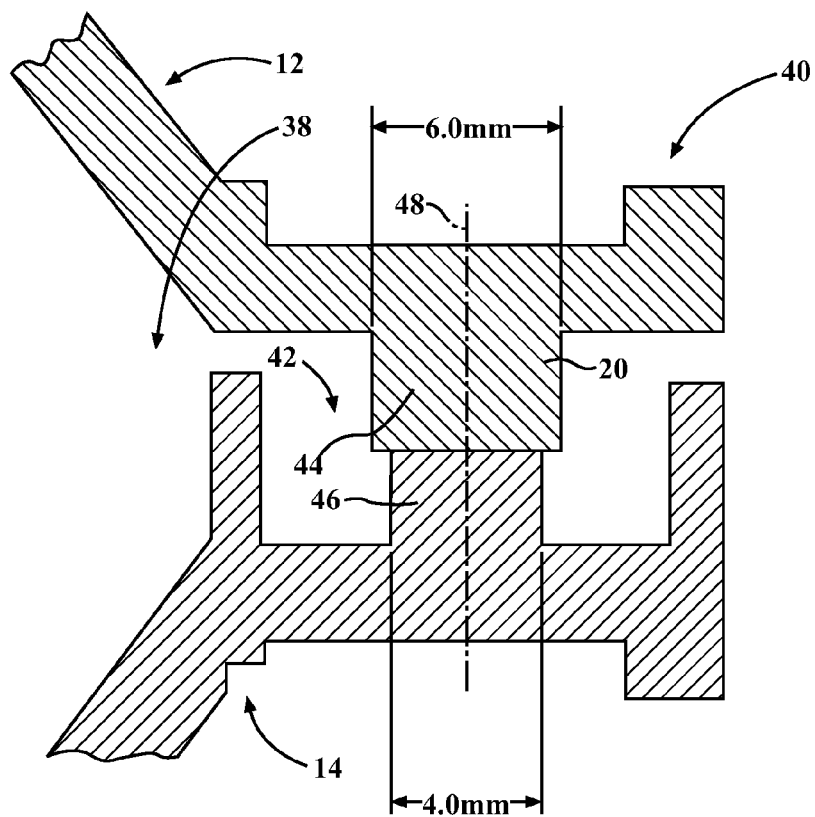
FIG. 7 is a cross-sectional view of the test article of FIG. 5 showing the joint as an alternative joint design.

A plurality of test articles 40 are produced. An example of the test articles 40 is shown in FIG. 5. The test articles 40 have the first and second body portions 12, 14 joined together by a joint 42. The test articles 40 are divided into two groups. More specifically, the test articles 40 are divided in Group A test articles and Group B test articles. The Group A test articles have the frictional weld joint 18, as described above, and is shown in FIG. 6. The Group B test articles have an alternative weld joint, which is shown in FIG. 7.

The Group A test articles include the first bead 20 having a thickness of 6.0 millimeters and the second bead 24 having a thickness of 4.6 millimeters. The second bead 24 is split into the interior stem 34, which has a thickness of 2.5 millimeters, the exterior stem 36, which has a thickness of 1.1 millimeters, and the cavity 38, which has a width of 1.0 millimeters. As such, the second bead 24 has a total thickness of 4.6 millimeters. Additionally, the centerlines 22, 26 of the first and second beads 20, 24 are offset 0.2 millimeters from one another. A cross-section showing the frictional weld joint 18 of the Group A test articles with dimensions is shown in FIG. 6.

The Group B test articles have the alternative weld joint, which has an upper bead 44, which has thickness of 6.0 millimeter, and a lower bead 46, which has a thickness of 4.0 millimeter thickness. The upper and lower beads 44, 46 of the Group B test articles have a common centerline 48. A cross-section showing the alternative weld joint of the Group B test articles is shown in FIGS. 7.

It is important to note that the cross-sectional area of the contact surface of the second bead 24 of the Group A test articles 40 is less than a cross-sectional area of a contact surface of the lower bead 46 of the Group B test articles. More specifically, the second bead 24 of the Group A test articles has a total thickness of 4.6 millimeters with the cavity 38 occupying 1.0 millimeters of the total width. Therefore, cross-sectional area of the contact surface of the second bead 24 of the Group A test articles 40 is only defined by the interior and exterior stems 34, 36, which has a combined thickness of 3.6 millimeters. The cross-section area of the contact surface of the lower bead 46 of the Group B test articles is defined by the full thickness of the lower bead 46, which is 4.0 millimeters.

It is expected that the alternative weld joint of the Group B test articles, which has the larger cross-sectional area of the contact surface, would be stronger than the frictional weld joint 18 of the Group A test articles. However, as exhibited in Table 1 below, the frictional weld joint 18 of the Group A test articles is stronger than the alternative weld joint of the Group B test articles, which is contrary to expectations.

A first pressure failure test is conducted on the Group A and Group B test articles to determine a pressure at which the frictional weld joint 18, in the case of the Group A test articles, or the alternative weld joint in the case of the Group B test articles, fails. As part of the first pressure failure test, the first and second body portions 12, 14 are coupled together using the method described above to form the Group A and Group B test articles. The force is applied to the Group A and Group B test articles until, in the case of the Group A test articles the second bead 24 penetrates the first bead 20 or in the case of the Group B test articles the lower bead 46 penetrates the upper bead 44, by about 1.5 millimeters. The force is removed and the first and second body portions 12, 14 are fused together. The clamp pressure applied during the coupling of the first and second body portions 12, 14 is varied to produce Group A and the Group B test articles formed under different clamp pressures. Once the first and second body portions 12, 14 are coupled together, air is injected into the interior chamber 38 until the frictional weld joint 18 or the alternative weld joint fails. The results are shown in Table 1 below.

TABLE 1

First Pressure Failure Test

| Clamp Pressure (Mpa) | Group A Failure Pressure (psi) | Group B Failure Pressure (psi) | % Difference |
| --- | --- | --- | --- |
| 1 | 192 | 179 | 7% |
| 1.6 | 165 | 131 | 26% |
| 3 | 124 | 116 | 7% |
| 6.2 | 84 | 79 | 7% |
| Average | 141 | 126 | 12% |

As shown in Table 1, the Group A test articles, which have the frictional weld joint 18, are able to withstand higher pressures within the internal chamber before failure. More specifically, between the four clamp pressures tested, the frictional weld joint 18 of the Group A test articles was able to withstand pressures that were on average 12% higher compared to the alternative weld joint of the Group B test articles. As described above, this was unexpected because the Group B test articles had a larger cross-section area of the contact surface relative to the cross-sectional area of the contact surface of the Group A test articles. It is believed that the ability of the Group A test articles to withstand higher pressures is the result of limiting the stresses acting on the interior stem 34 and the exterior stem 36 by splitting the second bead 24 and offsetting the centerline 22 of the first and second beads 20, 24.

After the first pressure failure test was complete, it was observed that the body portions 12, 14 of both the Group A and Group B test articles were not properly aligned during the fusing process. Because it is believe that offsetting the centerlines of the first bead 20 and the second bead 24 provide a stronger joint, care must be taken to ensure the body portions 12, 14 of both the Group A and Group B test articles are properly aligned. As such, a second set of Group A and Group B test articles were produce with the body portions 12, 14 properly aligned. A second pressure failure test is performed on the second set of Group A and Group B test articles following the procedures described above. The results are shown in Table 2 below.

TABLE 2

Second Pressure Failure Test

| Clamp Pressure (Mpa) | Group A Failure Pressure (psi) | Group B Failure Pressure (psi) | % Difference |
|---|---|---|---|
| 1 | 217 | 182 | 19% |
| 1.6 | 210 | 172 | 22% |
| 3 | 166 | 129 | 29% |
| 4 | 148 | 108 | 37% |
| Average | 185 | 147 | 27% |

As shown in Table 2, properly aligning the body portions 12, 14 of the Group A and Group B test articles increased the strength of the frictional weld joint 18 of the Group A test articles and the alternative weld joint of the Group B test articles. However, the percent improvement of the Group A test articles compared to the Group B test articles was greater. More specifically, between the four clamp pressures tested, the frictional weld joint 18 of the Group A test articles was able to withstand pressures that were on average 27% higher compared to the alternative weld joint of the Group B test articles.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An article comprising a thermoplastic material, said article comprising;
   a first body portion having a first joint surface;
   a second body portion for coupling with said first body portion, said second body portion having a second joint surface parallel to said first joint surface; and
   a frictional weld joint disposed between said first joint surface and said second, said frictional weld joint comprising:
      a first bead coupled to said first joint surface and extending axially along a centerline from said first joint surface; and
      a second bead coupled to said second joint surface and extending axially along a centerline from said second joint surface for fusing with said first bead to couple together said first and second body portions to form said article;
   wherein said second bead has an interior stem having a thickness of from about 2.5 to about 3.5 millimeters with said thickness of said interior stem adjacent said first bead, and an exterior stem spaced from said interior stem having a thickness of from about 1.10 to about 2.50 millimeters with said thickness of said exterior stem adjacent said first bead and different than said thickness of said interior stem,
   wherein said exterior stem and said interior stem define a cavity therebetween for receiving an amount of flash resulting from the fusing of said first and second beads; and
   wherein said centerline of said first bead is offset from said centerline of said second bead for reducing stresses acting on said frictional weld joint as a result of stresses acting on said first and second body portions.

2. An article as set forth in claim 1 wherein said first and second beads comprise a material selected from the group of nylon 6, nylon 6/6, polyvinyl chloride, polybutylene terephthalate, polyacetal, and combinations thereof.

3. An article as set forth in claim 1 wherein said cavity defined between said interior and exterior stems has a width of from about 1.5 to about 7.0 millimeters.

4. An article as set forth in claim 1 wherein each of said first and second beads have a height of from about 2.0 to about 4.0 millimeters.

5. An article as set forth in claim 1 wherein said interior stem of said second bead has a thickness of about 2.5 millimeters.

6. An article as set forth in claim 5 wherein said exterior stem of said second bead has a thickness of about 1.1 millimeters.

7. An article as set forth in claim 6 wherein said cavity defined between said interior and exterior stems has a width of about 1.0 millimeters.

8. An article as set forth in claim 1 wherein said centerline of said second bead is offset a distance of from about 0.20 to about 0.80 millimeters from said centerline of said first bead.

9. An article as set forth in claim 1 wherein said centerline of said second bead is offset a distance of about 0.20 millimeters from said centerline of said first bead.

10. A frictional weld joint for coupling together a first body portion and a second body portion of an article, which comprises a thermoplastic material, with the first body portion having a first joint surface and the second body having a second joint surface parallel with the first joint surface, said frictional weld joint comprising:
   a first bead extending axially along a centerline from the first joint surface; and
   a second bead extending axially along a centerline from the second joint surface for fusing with said first bead to couple together the first and second body portions of the article;
   wherein said second bead has an interior stem having a thickness of from about 2.5 to about 3.5 millimeters with said thickness of said interior stem adjacent said first bead, and an exterior stem spaced from said interior stem having a thickness of from about 1.10 to about 2.50 millimeters with said thickness of said exterior stem adjacent said first bead and different than said thickness of said interior stem,
   wherein said exterior stem and said interior stem define a cavity therebetween for receiving an amount of flash resulting from the fusing of said first and second beads; and
   wherein said centerline of said first bead is offset from said centerline of said second bead for reducing stresses acting on said frictional weld joint as a result of stresses acting on the first and second body portions.

11. A frictional weld joint as set forth in claim 10 wherein said first and second beads comprise a material selected from the group of nylon 6, nylon 6/6, polyvinyl chloride, polybutylene terephthalate, polyacetal, and combinations thereof.

12. A frictional weld joint as set forth in claim 10 wherein said cavity defined between said interior and exterior stems has a width of from about 1.5 to about 7.0 millimeters.

13. A frictional weld joint as set forth in claim 10 wherein each of said first and second beads have a height of from about 2.0 to about 4.0 millimeters.

14. A frictional weld joint as set forth in claim 10 wherein said interior stem of said second bead has a thickness of about 2.5 millimeters.

15. A frictional weld joint as set forth in claim 14 wherein said exterior stem of said second bead has a thickness of about 1.1 millimeters.

16. A frictional weld joint as set forth in claim 15 wherein said cavity defined between said interior and exterior stems has a width of about 1.0 millimeters.

17. A frictional weld joint as set forth in claim 10 wherein said centerline of said second bead is offset a distance of from about 0.20 to about 0.80 millimeters from said centerline of said first bead.

18. A frictional weld joint as set forth in claim 10 wherein said centerline of said second bead is offset a distance of about 0.20 millimeters from said centerline of said first bead.

19. A method of coupling together first and second body portions of an article, which comprises a thermoplastic material, using a frictional weld joint with the first body portion having a first joint surface and the second body having a second joint surface parallel with the first joint surface, said method comprising the steps of;
providing a first bead extending axially along a centerline from the first joint surface;
providing a second bead extending axially along a centerline from the second joint surface;
positioning the first and second beads in contact with each other with the centerline of the second bead offset from the centerline of the first bead;
applying a force to at least one of the first body portion and the second body portion to generate friction between the first and second beads to allow at least one of the first bead and the second bead to penetrate the other one of the first and second beads; and
removing the force whereby the first and second beads fuse together to couple together the first body portion and the second body portion of the article,
wherein the second bead has an interior stem having a thickness of from about 2.5 to about 3.5 millimeters with the thickness of the interior stem adjacent the first bead, and an exterior stem spaced from the interior stem having a thickness of from about 1.10 to about 2.50 millimeters with the thickness of the exterior stem adjacent the first bead and different than the thickness of the interior stem, and wherein the exterior stem and the interior stem define a cavity therebetween for receiving an amount of flash resulting from the fusing of the first and second beads.

20. A method as set forth in claim 19 further comprising the step of applying pressure to the first and second body portions to temporarily hold the first and second beads together.

21. A method as set forth in claim 19 wherein the step of positioning the first and second beads in contact with each other is further defined as offsetting the centerlines of the first and second beads a distance of about 0.20 to about 0.80 as the first body portion is positioned against the second body portion.

22. A method as set forth in claim 19 wherein the first and second beads comprise a material selected from the group of nylon 6, nylon 6/6, polyvinyl chloride, polybutylene terephthalate, polyacetal, and combinations thereof and the step of applying a force to either the first or second body portions is further defined as vibrating one of the first and second body portions relative to the other one of the first and second body portions to allow the second bead to penetrate the first bead.

* * * * *